(12) United States Patent
Cairo et al.

(10) Patent No.: US 7,828,526 B2
(45) Date of Patent: Nov. 9, 2010

(54) METALLIC BLADE HAVING A COMPOSITE INLAY

(75) Inventors: Ronald Ralph Cairo, Greer, SC (US); Jianqiang Chen, Greenville, SC (US)

(73) Assignee: General Electric Company, Schenectady, NY (US)

( * ) Notice: Subject to any disclaimer, the term of this patent is extended or adjusted under 35 U.S.C. 154(b) by 778 days.

(21) Appl. No.: 11/786,093

(22) Filed: Apr. 11, 2007

(65) Prior Publication Data
US 2008/0253887 A1 Oct. 16, 2008

(51) Int. Cl.
*F01D 5/14* (2006.01)
(52) U.S. Cl. .................. 416/224; 416/230; 416/229 A; 416/241 R
(58) Field of Classification Search .......... 416/224, 416/229 R, 229 A, 230, 236 R, 241 A, 241 R, 416/241 B
See application file for complete search history.

(56) References Cited

U.S. PATENT DOCUMENTS

| | | | | |
|---|---|---|---|---|
| 3,699,623 A * | 10/1972 | Kreider | .................. | 29/889.71 |
| 5,279,892 A * | 1/1994 | Baldwin et al. | ............. | 442/206 |
| 5,490,764 A * | 2/1996 | Schilling | ................... | 416/239 |
| 5,634,771 A * | 6/1997 | Howard et al. | .......... | 416/241 A |
| 5,791,879 A * | 8/1998 | Fitzgerald et al. | ........ | 416/229 A |
| 5,839,882 A * | 11/1998 | Finn et al. | ............... | 416/229 A |
| 7,547,194 B2 * | 6/2009 | Schilling | ................... | 416/230 |
| 2002/0085917 A1 * | 7/2002 | Roberts et al. | .......... | 416/220 R |
| 2005/0014010 A1 * | 1/2005 | Dumm et al. | ............... | 428/472 |
| 2005/0053466 A1 * | 3/2005 | Finn et al. | ................... | 416/230 |
| 2005/0084379 A1 * | 4/2005 | Schreiber | .................... | 416/230 |
| 2006/0039788 A1 * | 2/2006 | Arnold et al. | ........... | 416/204 R |
| 2007/0065291 A1 * | 3/2007 | Karafillis | .................... | 416/224 |
| 2007/0292274 A1 * | 12/2007 | Burdgick et al. | ........ | 416/229 A |

\* cited by examiner

*Primary Examiner*—Edward Look
*Assistant Examiner*—Jesse Prager
(74) *Attorney, Agent, or Firm*—Cantor Colburn LLP

(57) ABSTRACT

A blade is disclosed. The blade includes a metallic base comprising an airfoil, a section of the airfoil comprising a recess within a surface of the airfoil, and a composite inlay disposed within and bonded to the recess.

21 Claims, 6 Drawing Sheets

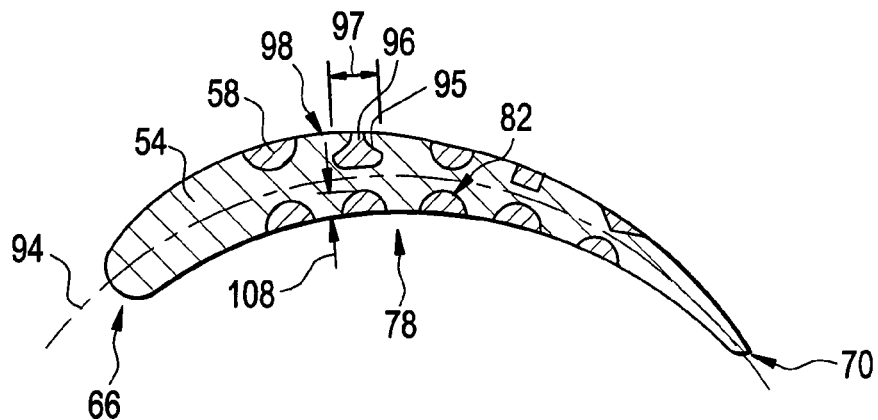
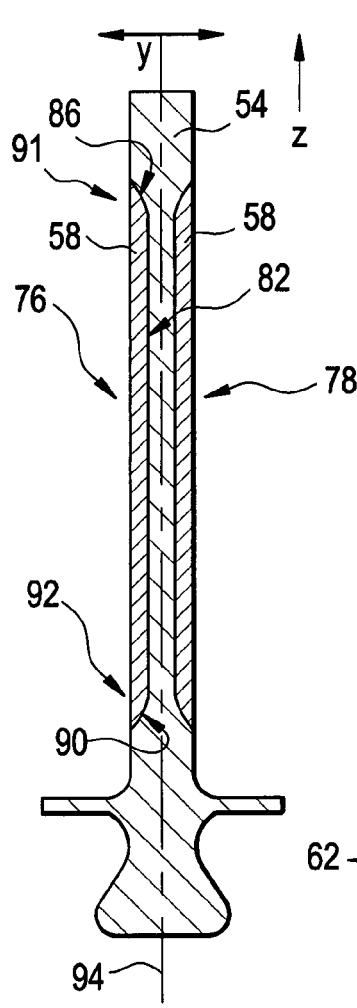
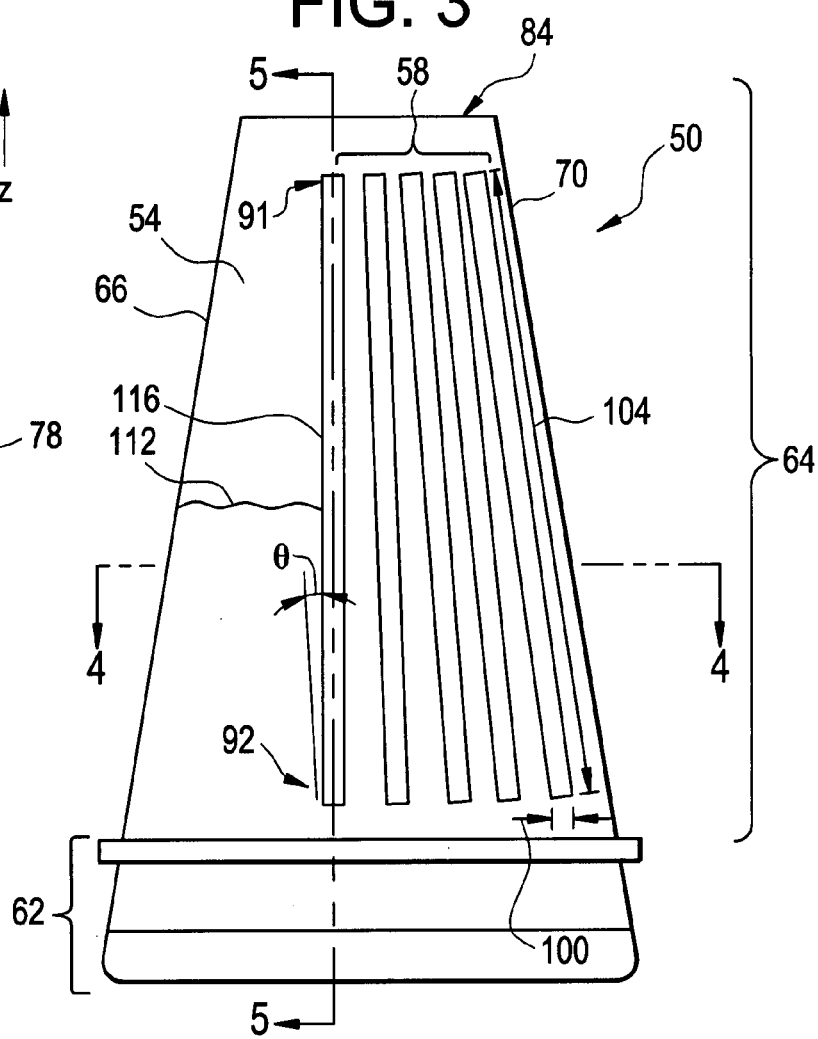

FIG. 10
FIG. 11
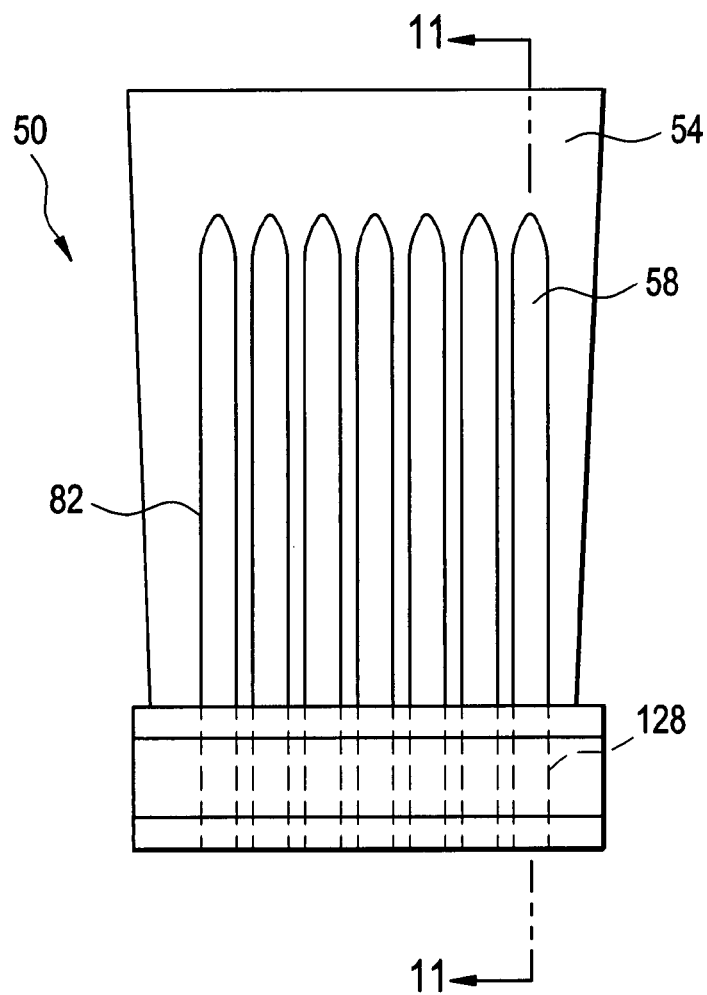
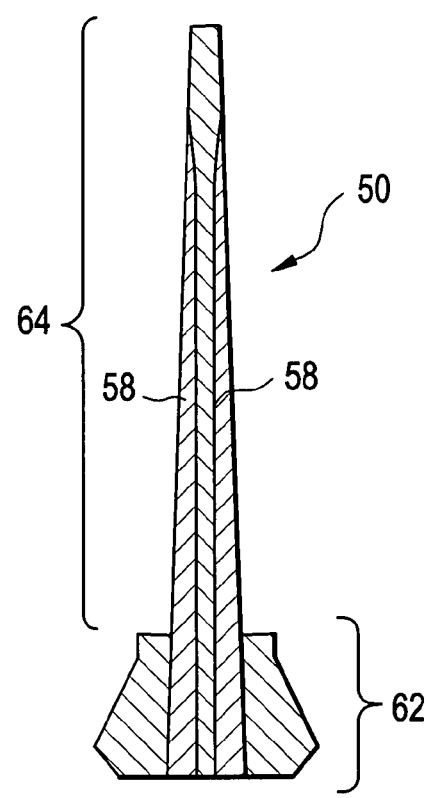

METALLIC BLADE HAVING A COMPOSITE INLAY

BACKGROUND OF THE INVENTION

The present disclosure relates generally to turbines, and particularly to aeromechanical blade configuration.

Current aeromechanical blades, such as compressor blades and turbine blades for example, can experience peak stress at a leading edge, which result in cracks of the leading edge as well as a root attachment of the blade to a rotor disk. Attempts to reduce leading edge stress within existing applications via design features, such as under-cuts for example, have provided some satisfactory results, but leave room for improvement. Changes in design of the blade or root attachment may shift a load path aft, away from the leading edge to thereby reduce a stress level at the leading edge, but such changes in design may not be feasible for use within existing applications. Accordingly, there is a need in the art for an aeromechanical blade arrangement that overcomes these drawbacks.

BRIEF DESCRIPTION OF THE INVENTION

An embodiment of the invention includes a blade. The blade includes a metallic base comprising an airfoil, a section of the airfoil comprising a recess within a surface of the airfoil, and a composite inlay disposed within and bonded to the recess.

Another embodiment of the invention includes a turbine. The turbine includes an outer frame to direct a gas flow, a rotor disposed within the outer frame, and a plurality of blades in operable communication with the rotor. At least one of the plurality of blades includes a metallic base comprising an airfoil, a section of the airfoil comprising a recess within a surface of the airfoil, and a composite inlay disposed within and bonded to the recess.

These and other advantages and features will be more readily understood from the following detailed description of preferred embodiments of the invention that is provided in connection with the accompanying drawings.

BRIEF DESCRIPTION OF THE DRAWINGS

Referring to the exemplary drawings wherein like elements are numbered alike in the accompanying Figures:

FIG. 3 depicts a side view of a blade in accordance with an embodiment of the invention;

FIGS. 4 and 5 depict section views of the blade of FIG. 3 in accordance with an embodiment of the invention;

FIGS. 6, 8, and 10 depict side views of a blade in accordance with embodiments of the invention; and FIGS. 7, 9, and 11 depict section views of the blades of FIGS. 6, 8, and 10, respectively, in accordance with embodiments of the invention.

DETAILED DESCRIPTION OF THE INVENTION

An embodiment of the invention provides a designed material system aeromechanical blade (also herein referred to as a "blade"), such as a turbine blade or compressor blade for example, to take advantage of properties of different materials by strategically placing materials such that their properties provide specific benefits. The designed material system takes advantage of a high specific strength and stiffness of a composite material in combination with a wear and rub resistance, dimensional control, and overall robustness of a monolithic metallic back-structure and root attachment to shift a load path aft away from the leading edge of a given blade design. As used herein, the term "specific strength" shall refer to a ratio of any given strength (such as tensile, compressive, or shear strength for example) of a material to a density of the material. Similarly, the term "specific stiffness" shall refer to a ratio of any given stiffness of a material to a density of the material. The designed material system also reduces an average density of the blade to provide a reduction in centrifugal loading. Additionally, parameters of the designed material system allow adjustment of a natural frequency of the blade.

Figure 1:
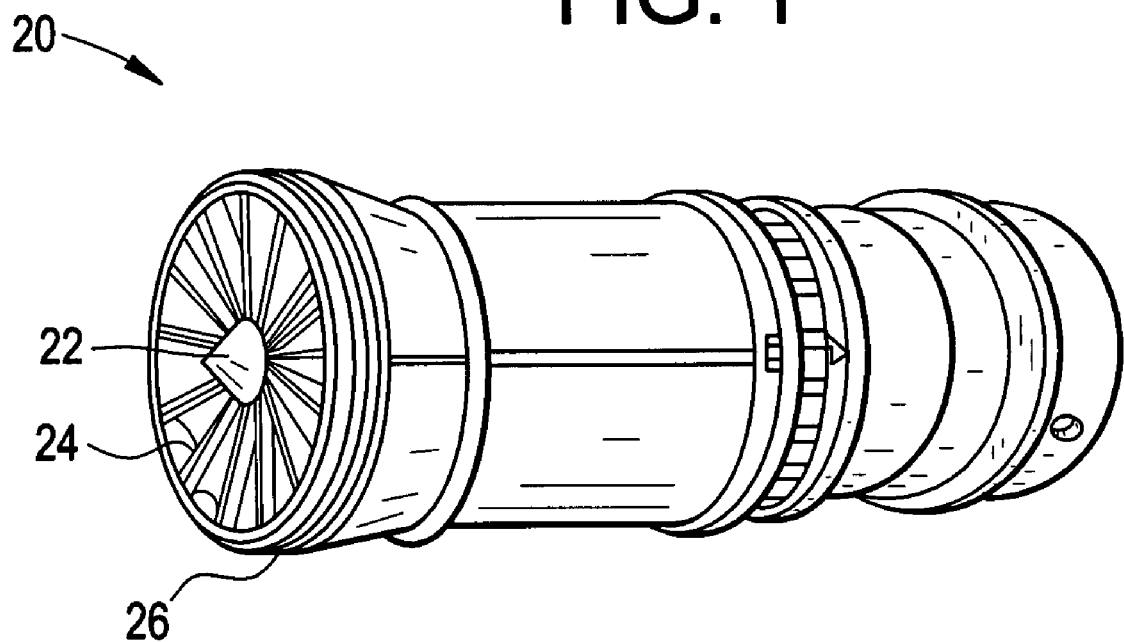
FIG. 1 depicts a turbine in accordance with an embodiment of the invention.
Figure 2:
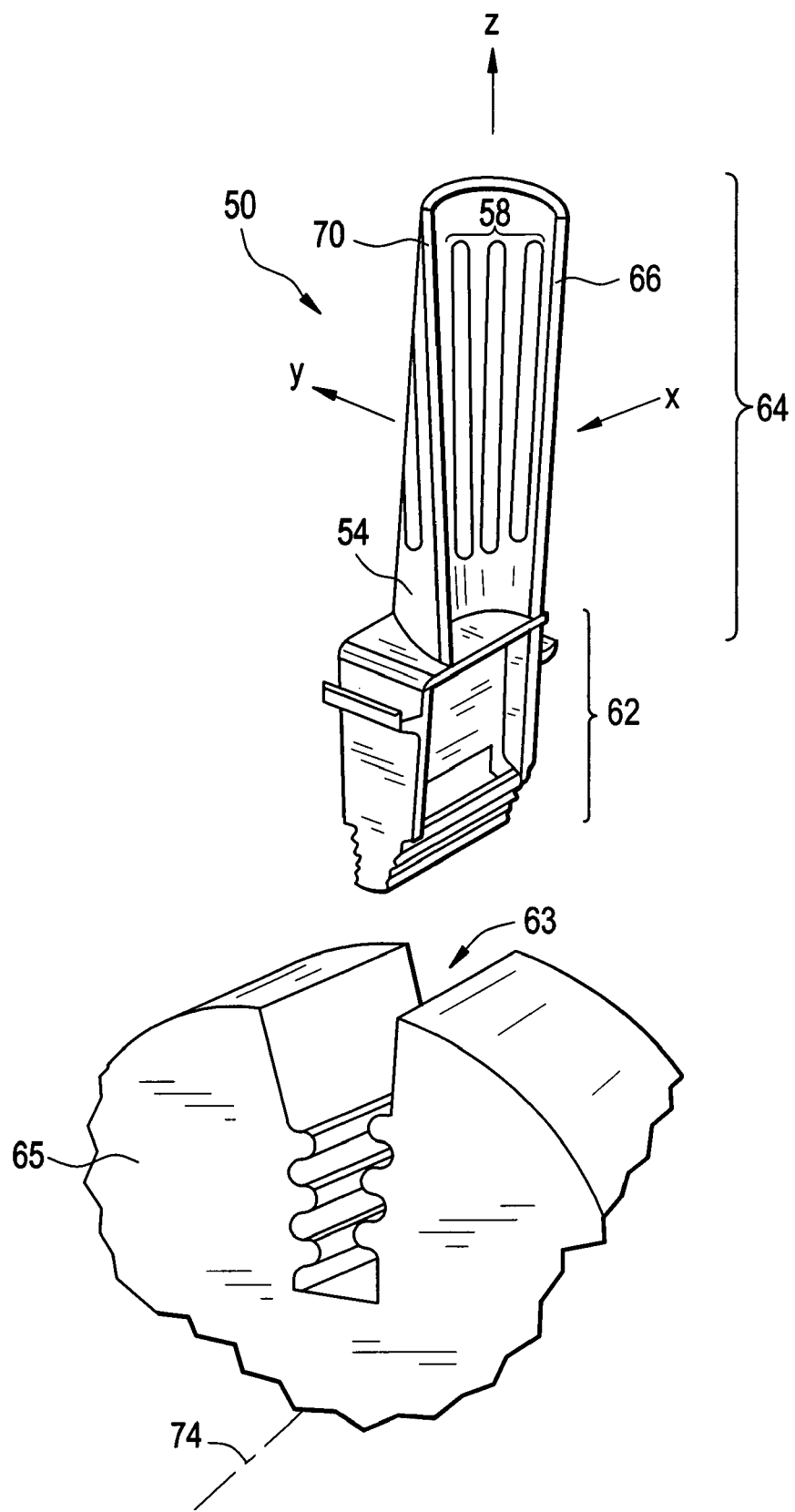
FIG. 2 depicts a perspective view of a blade in accordance with an embodiment of the invention.

FIG. 1 depicts a turbine 20 that uses a plurality of turbine blades and compressor blades (one example of which is depicted in FIG. 2) in operable communication with a rotor shaft 22 via a rotor 24 to convert thermal energy to mechanical energy via rotation of the rotor 24. A gas flows into the outer frame 26 and is directed by the outer frame 26 to act upon the plurality of turbine blades. The turbine blades provide a transformation of energy associated with an expansion of the gas into rotation of the rotor 24. The rotor 24 is rotatably disposed proximate the center of the turbine 20 in a manner that will be appreciated by one skilled in the art. The turbine 20 may be a gas turbine, which converts thermal energy resulting from expansion of combustion gasses, for providing mechanical energy to propel a vehicle, such as an airplane, a ship, or a train for example, for generating electricity, or for providing mechanical energy for other applications, such as pumping, for example. Alternatively, the turbine 20 may be a steam turbine, which converts thermal energy resulting from expansion of high temperature steam to mechanical energy for any variety of uses, such as those described above, for example.

Referring now to FIG. 2, a perspective view of an embodiment of a composite inlaid blade 50 is depicted. The blade 50 includes a metallic back-structure 54, (also herein referred to as a "base") and a set of composite inlays 58. As used herein, the reference numeral 58 shall refer to one or more inlays of the set of composite inlays. The metallic base 54 includes an integral root attachment 62, such as a multi-tooth attachment or "firtree" (as depicted in FIG. 2) and a single-tooth attachment or "dovetail" (as depicted in FIGS. 3 and 5), for example. It will be appreciated that the attachment 62 has geometry that is complementary to geometry of an opening 63 disposed within a rotor disk 65, for attaching the blade 50 to the rotor 24 via the rotor disk 65. The blade 50 also includes an airfoil 64 having a leading edge 66 and a trailing edge 70.

The airfoil 64 of a compressor blade 50, in response to rotation of the plurality of blades 50 (in a direction from a leading edge 66 toward a trailing edge 70), acts to compress and add energy to the flow of gas or steam. Force imparted from the rotor disk 65 is transferred to the compressor blade via the single-tooth attachment, or dovetail 62. Furthermore, a centrifugal force (in addition to the force generated as a reaction to gas or steam compression) is generated in an outward radial direction, as indicated by arrow Z and is transferred through the compressor blade 50 to the rotor disk 65 via the dovetail 62 (best seen in reference to FIG. 3). Compressor blades are typically made from materials having an equiaxed grain structure.

The airfoil 64 of a turbine blade 50, in response to a flow of expanding gas or steam in a direction as demonstrated by arrow X over the leading edge 66 toward the trailing edge 70, imparts a force upon the turbine blade 50 in a direction as demonstrated by arrow Y. The turbine blade 50 transfers the imparted force to the rotor disk 65 via the firtree 62, thereby causing the turbine blade 50 (with the rotor disk 65) to rotate about a center 74, such as the rotor shaft 22. In response to rotation of the turbine blade 50, (and the rotor disk 65) a centrifugal force is generated in an outward radial direction. The centrifugal force (in addition to the force resulting from the flow of expanding gas or steam) is transferred through the turbine blade 50 to the rotor disk 65 via the firtree 62. To withstand greater operating temperatures (as will be discussed further below), turbine blades are typically made of a single crystal material that has higher density than compressor blade materials. Furthermore, typical turbine blades are larger than respective compressor blades. It will be appreciated that the turbine blades therefore utilize the multi-tooth firtree 62 to transmit the higher forces, which result from the higher density and size of the turbine blade, to the rotor disk 65.

The leading edge 66 of the airfoil 64 is relatively straight and thick, forming a direct path to the dovetail 62. The trailing edge 70 is thinner than the leading edge 66 and may be curved relative to the leading edge 66. It will be appreciated by one having skill in the art that the leading edge 66 provides a relatively direct load path to transfer forces from the airfoil 64 to the attachment 62, which frequently results in development of a peak stress of the blade 50 at or near the leading edge 66.

Referring now to FIGS. 3, 4, and 5 an end view and two cross section views of an embodiment of the blade 50 are depicted. The set of composite inlays 58 are depicted disposed on two sides 76, 78 of the blade 50. The composite material of the inlays 58 provides a higher specific strength (strength to density ratio) and a higher specific stiffness (stiffness to density ratio) than the metallic materials from which the base 54 is made, such as titanium, superalloy steels, and martensitic stainless steels, for compressors for example.

The composite inlays 58 are disposed within recesses 82 within a surface of the airfoil 64. The recesses 82 represent a portion, or less than 100% of the total area of the airfoil 64. The recesses 82 are formed into the metallic base 54 by any suitable process, such as machining or forging for example. It will be appreciated that a depth of the recesses 82 is less than the thickness of the airfoil 64, such that the recesses 82 do not penetrate through the airfoil 64. In an embodiment, the recesses 82 are oriented in the radial direction, as demonstrated by the arrow Z and the composite material includes unidirectional continuous fibers aligned with the recesses 82. The set of composite inlays 58 are adhesively bonded within the recesses 82 of the metallic base 54. Additionally, the composite inlays 58 are mechanically restrained from outward radial motion by the metallic base 54. Removal of material from the metallic base 54 to form the recesses 82 reduces a mass of the metallic base 54. Furthermore, subsequent replacement of the comparatively dense metallic material removed from the base 54 with the composite inlays 58 having less density results in the blade 50 having a lower total mass and average density. The lower average density further reduces blade loading of the airfoil attachment, as will be described further below.

In embodiments of the compressor blade 50, the early stages of which typically operate at temperatures below approximately 150 degrees Celsius, the inlays 58 are made from a composite material such as continuous fiber reinforced carbon/epoxy for example. It will be appreciated that alternate composite materials, including fiber materials such as boron or silicon carbide that have greater stiffness than the metallic back structure 54 base and influence response to loads, deformations, and rotations, for example. Matrix materials such as phenolic, polyester, and polyurethane for example, are contemplated as within the scope of embodiments of the invention.

In embodiments of the turbine blade 50, which can reach operating temperatures exceeding 1200 degrees Celsius, the inlays 58 are made from a high temperature composite, such as a ceramic composite, for example. In alternate embodiments of the turbine blade 50, a pre-cured high temperature composite inlay 58, such as a ceramic inlay 58, is bonded within a recess 82 of the airfoil 64 with a ceramic adhesive. Known ceramic adhesives for example, that are currently utilized for bonding strain gauges to turbine blades 50, are contemplated as suitable for bonding such high temperature inlays 58.

In an embodiment, geometry of a recess 95 provides lateral retention of an inlay 96. A width 97 of the recess 95 increases as a distance from a surface 98 of the blade 50 also increases, thereby restraining the inlay 96 in the lateral direction, demonstrated by direction line Y. It will be appreciated that a composite material, such the carbon/epoxy composite, for example, is malleable and formable, which allows it to be inserted into the recess 95. Subsequent to curing, the composite material hardens, restraining, or preventing liberation of the inlay 96 from the recess 95.

The metallic base 54 includes the attachment 62 integral with the airfoil 64 for providing direct transfer of forces from the airfoil 64 to the attachment 62. Selection of appropriate metallic materials enhance rub and wear resistance of the metallic base 54. Additionally, the metallic base 54 provides dimensional control for key aerodynamic areas such as the leading edge 66, the trailing edge 70, an airfoil tip 84, and the attachment 62. Dimensional control provided by the metallic base 54 including the integral attachment 62 allows the blade 50 to be retrofitted into existing applications.

Because of a greater stiffness of the composite inlay 58 relative to the base 54, a localized relative increase of reactive force will accompany disposal of the inlay 58 within the blade 50. That is, in response to an application of force upon the blade 50 resulting from turbine 20 operation, the increased stiffness of the composite inlay 58 will provide a greater reactive force than the metallic back structure 54. Therefore, the reactive force (and accompanying stress) of the turbine blade 50 is greater, or concentrated in areas in which the composite inlays 58 are disposed, than the reactive force in the same areas absent disposal of the composite inlays 58. Accordingly, disposal of the composite inlays 58 proximate the trailing edge 70 of the blade 50 shifts the transmission of reactive force (and accompanying stress) aft, toward the trailing edge 70, thereby providing a relative reduction in the peak stress magnitude of the leading edge 66 of the blade 50. Such reduction in leading edge 66 peak stress magnitude reduces the potential for cracking of the leading edge 66 and attachment 62. Additionally, placement of the composite inlays 58 at the lateral outboard surfaces of the blade 50 (best seen with reference to FIGS. 4 and 5), such that a lateral center 94 of the blade 50 includes the metallic base 54 increases a flexural rigidity or bending strength of the blade 50 for resisting gas pressure loading and for increasing specific resonant frequencies.

An axis of rotation 74 of the turbine blade 50 defines a radial direction, such as indicated by direction Z, for example. The inlays 58 include tapers 86, 90 in the radial direction having reduced thickness in a lateral direction, as demonstrated by direction line Y, at radial outboard and radial inboard ends 91, 92, respectively, (also herein referred to as a first end and a second end) of the inlays 58. Accordingly, the radial tapers 86, 90 define a reduced lateral thickness of the inlays 58 at the ends 91, 92, for controlling (reducing) an amount of reactive force generated by the inlays 58 and transferred to the base 54 in response to operating forces of the turbine 20. The reduction of force generated by the inlays 58 at the ends 91, 92 thereby provides a gradual transfer of force between the composite inlays 58 and the base 54, reducing a likelihood of bond failure at the ends 91, 92. It will be appreciated that selection of recess 82 geometry (as depicted in FIG. 4) can also effect the transfer of force between the composite inlays 58 and the base 54. For example transfer of force may be influenced by selection of cross sections that include any of semi-circular, semi-elliptical, parabolic, rectangular, and triangular geometry.

Replacement of the comparatively dense metallic material of the base 54 with the reduced density composite inlays 58 reduces an average density and total mass of the blade 50 of a given size, strength, and stiffness. A reduction in total mass of the blade 50 provides a corresponding reduction in a centrifugal force generated in response to rotation of the blade 50 at a given speed. The reduction in centrifugal force generated in response to rotation of the blade 50 at a given speed thereby reduces a loading known as disk rim loading in an interface between the attachment 62 of the blade 50 and the rotor disk 65. It will be appreciated that as a result of such reduction of disk rim loading, disk bore stresses are reduced. Such stress reductions provide additional benefits, such as reducing the size, mass, and cost of the rotor disk 65 for a given application, increasing a burst margin or limiting speed of the rotor disk 65, and increasing overall rotor 24 life. Alternatively, blades 50 having a reduced average density with an increased length for increasing turbine 20 performance may be utilized with a rotor disk 65 without a need to additionally strengthen the rotor disk 65, thereby increasing a performance of a given rotor 22 design.

Parameters of the composite inlay 58, such any of inlay width 100, inlay length 104, inlay depth 108, taper 86, 90 configuration, composite reinforcement material type, and composite matrix material type for example will effect the natural frequency of the blade 50. Additionally, an orientation $\theta$ of the inlay 58 relative to the radial direction Z can be selected to increase a torsional frequency or torsional shear modulus of the blade 50. As $\theta$ increases from 0 (that is, aligned with the radial direction Z) to 45 degrees, a torsional component of strength and frequency increases. Accordingly, appropriate selection of these parameters can tune the blade 50 such that the natural frequency of the blade 50 avoids known operational frequencies of the turbine 20.

Use of the composite inlays 58 further provides an enhanced damage tolerance of the blade 50. For example, propagation of a crack 112 (as depicted in FIG. 3) that may be initiated at the leading edge 66 may be halted when the crack 112 reaches an inlay 116. Boundaries defined by interfaces between the metal base 54 and the composite inlays 58 serve as crack arrestors should cracks occur in either the metal base 54 or the inlay 58. Accordingly, a risk of turbine 20 failure resulting from blade 50 liberation is reduced.

Figure 6:
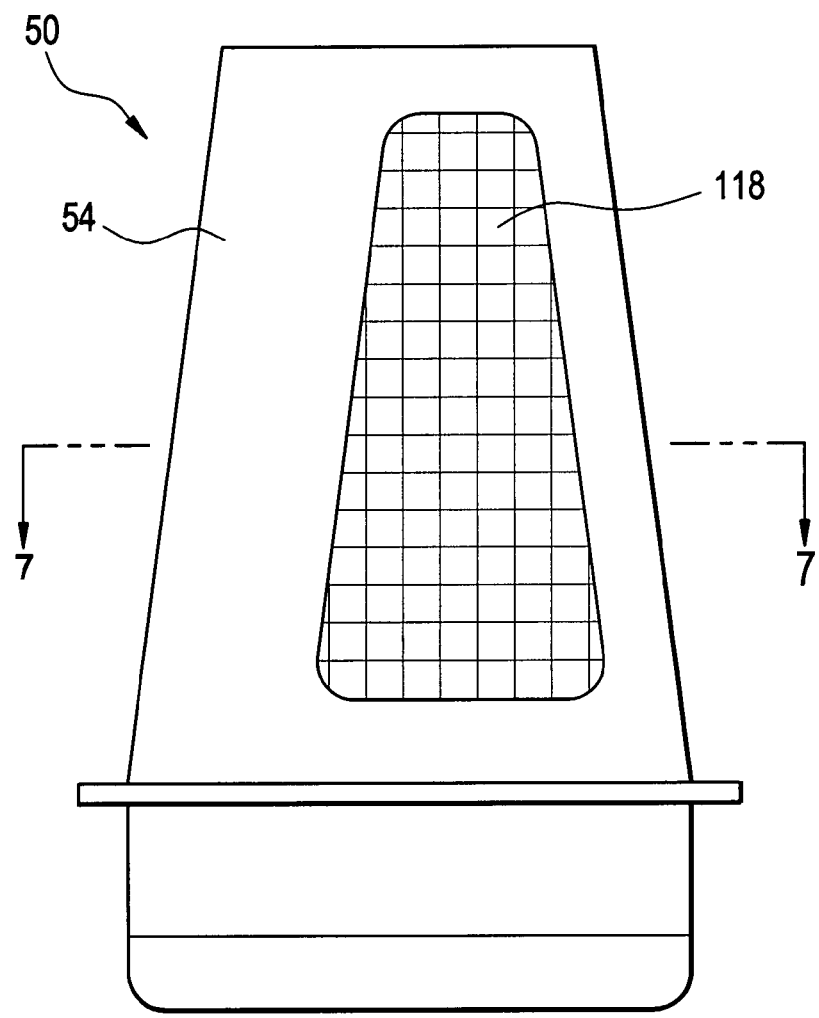
Figure 7:
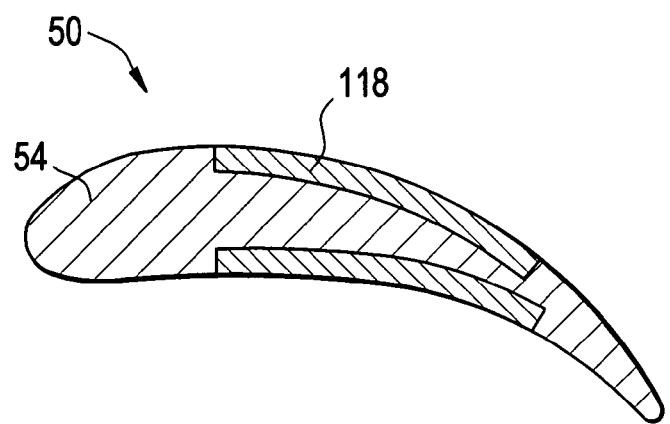

Referring now to FIGS. 6 and 7, an embodiment of the blade 50 having an inlay 118 of increased size is depicted. In an embodiment, the size of the inlay 118 is increased to allow use of a composite reinforcement material having fibers oriented in more than one direction, such as orthogonal reinforced composite material, for example. Use of the composite material with fibers oriented in more than one direction is contemplated to increase shear strength and stiffness as well as radial strength and stiffness.

Figure 8:
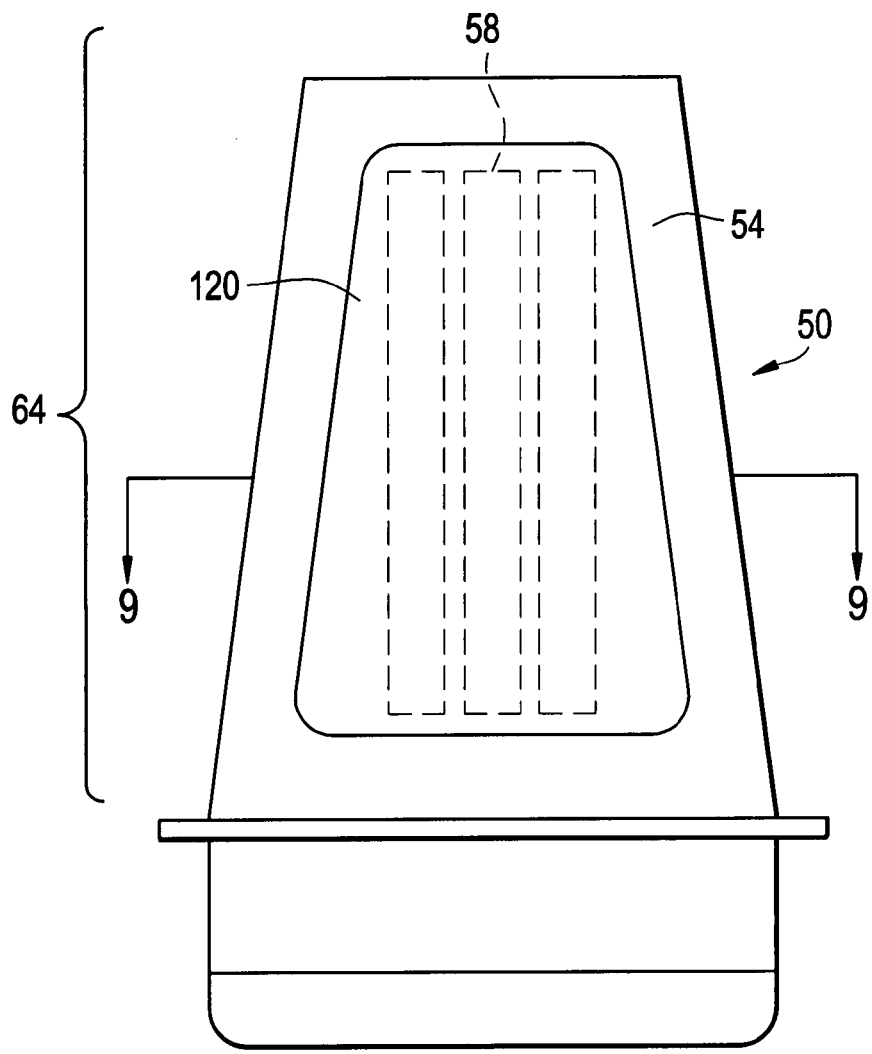
Figure 9:
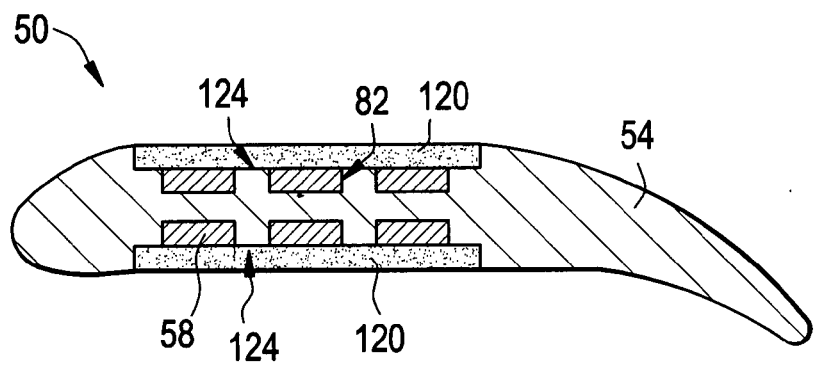

FIGS. 8 and 9 depict an embodiment of the blade 50 including a protective covering 120. The protective covering 120 has a wear and impact resistance that is greater a wear and impact resistance of material of the inlay 58, specifically the matrix, such as epoxy, for example. The protective covering is disposed upon the airfoil 54 such as to cover the inlays 58. Accordingly, the protective covering 120 increases a resistance to erosion of the composite material of the inlays 58, particularly the matrix, such as epoxy for example. Additionally, the protective covering 120 enhances a resistance to corrosion and foreign object damage of at least one of the metallic base 54 and the composite inlays 58, and provides a smooth, uniform aerodynamic surface.

In an embodiment, the protective covering 120 is a metallic cover that is disposed within a recess 124 formed or machined into the surface of the airfoil 64 surrounding the recesses 82, such that disposal of the protective coating 120 within the recess 124 provides a flush airfoil 64 surface. In one embodiment, the protective coating 120 is a metallic cover that is bonded, via an epoxy for example, to the airfoil 64 and the composite inlays 58 of the blade 50. In another embodiment, the protective covering 120 is a metallic cover that is laser welded to the airfoil 64. The metallic cover 120 additionally provides a further restraint upon the inlays 58 in the lateral direction, such that the inlays 58 will be fully restrained between the recesses 82 and the metallic cover 120. In yet another embodiment, the protective covering 120 is a metallic cover that is cold spray deposited onto the blade 50. It is contemplated that the metallic cover 120 will be made from any appropriate metal for use within the turbine 20, such as titanium alloy, superalloy steels, and martensitic stainless steels, for example. In alternate embodiments, the protective covering 120 is a plating applied to the blade 50, such as at least one of an electroplated nickel, and an electroless nickel-phosphorous plating, for example.

Referring now to FIG. 10 in conjunction with FIG. 11, another embodiment of the blade 50 is depicted. The recesses 82 extend through the attachment 62, thereby defining a bore 128 through the attachment 62. The inlays 58 are disposed such that they extend from the airfoil 64 into and through the attachment 62, bonded to the surface of the attachment 62 that defines the bore 128. Extending the inlays 58 through the attachment 62 increases at least one of a strength and a stiffness of the attachment 62, while further reducing a mass of the blade 50.

While an embodiment of the invention has been described having inlays 58 disposed on two sides 76, 78 of the blade 50, it will be appreciated that the scope of the invention is not so limited, and that the invention also applies to a blade that may have the inlays 58 disposed on only one side, such as one of side 76 and side 78, for example.

As disclosed, some embodiments of the invention may include some of the following advantages: an ability to reduce a peak stress of a turbine blade leading edge; an ability to reduce an average density of a turbine blade of given size and strength; an ability to reduce a rotor centrifugal loading; an ability to reduce a size of a rotor disk for a given application; an ability to tune a natural frequency of a turbine blade of given envelope dimensions; an ability to enhance turbine performance using larger turbine blades with a given rotor design; an ability to increase a damage tolerance of a turbine blade; and an ability to replace turbine blades in current applications with turbine blades having a reduced average density, enhanced damage tolerance, and reduced leading edge peak stress.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may be employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A blade comprising:
   a metallic base comprising an airfoil, a section of the airfoil comprising recesses within first and second opposing surfaces of the airfoil, each recess including a continuous uninterrupted surface; and
   a composite inlay disposed within and bonded to the continuous uninterrupted surface of each recess, the composite inlay including unidirectional continuous fibers aligned with the recesses, the composite inlay extending radially continuously from a first end to a second end through a mid-span section of the airfoil.

2. The blade of claim 1, wherein:
   a depth of the recesses is less than a thickness of the airfoil.

3. The blade of claim 1, wherein:
   the composite inlay comprises continuous fiber reinforced carbon epoxy.

4. The blade of claim 1, wherein:
   at least one of the first end and the second end comprise a taper, the taper having reduced thickness in a lateral direction for controlling an amount of force transferred between the metallic base and the composite inlay.

5. The blade of claim 4 having an axis of rotation defining a radial direction along the airfoil, wherein:
   the first end of the composite inlay is disposed radially outboard, and the second end is disposed radially inboard, relative to the axis of rotation.

6. The blade of claim 1, wherein:
   the metallic base further comprises an attachment having geometry complementary to an opening within a rotor disk for attaching the blade to the rotor disk.

7. The blade of claim 6, wherein:
   the blade is a turbine blade; and
   the attachment is a multi-tooth attachment.

8. The blade of claim 6, wherein:
   the blade is a compressor blade; and
   the attachment is a single-tooth attachment.

9. The blade of claim 6, wherein:
   the recesses extend through the attachment, thereby defining a bore therethrough; and
   the composite inlay is disposed within the bore, bonded to a surface of the attachment defining the bore.

10. The blade of claim 1, further comprising:
    a covering having a wear and impact resistance that is greater than a wear and impact resistance of material of the composite inlay, the covering disposed over the composite inlay.

11. The blade of claim 10, wherein:
    the covering comprises titanium alloy.

12. The blade of claim 10, wherein the covering is epoxy bonded to the airfoil.

13. The blade of claim 10, wherein the covering is laser welded to the airfoil.

14. The blade of claim 10, wherein the covering comprises at least one of:
    an electrolytic nickel plating; and
    an electroless nickel-phosphorous plating.

15. The blade of claim 1, having an axis of rotation defining a radial direction along the airfoil wherein:
    an angle of orientation of the composite inlay relative to the radial direction is between 0 and 45 degrees.

16. A turbine comprising:
    an outer frame to direct a gas flow;
    a rotor disposed within the outer frame; and
    a plurality of blades in operable communication with the rotor, at least one of the plurality of blades comprising:
      a metallic base comprising an airfoil, a section of the airfoil comprising recesses within first and second opposing surfaces of the airfoil, each recess including a continuous uninterrupted surface; and
      a composite inlay disposed within and bonded to the continuous interrupted surface of each recess, the composite inlay including unidirectional continuous fibers aligned with the recesses the composite inlay extending radially continuously from a first end to a second end through a mid-span section of the airfoil.

17. The turbine of claim 16, wherein:
    the composite inlay comprises continuous fiber reinforced carbon epoxy.

18. The turbine of claim 16, wherein:
    at least one of the first end and the second end comprise a taper, the taper having reduced thickness in a lateral direction for controlling an amount of force transferred between the metallic base structure and the composite inlay.

19. The compressor of claim 16, wherein:
    the metallic base further comprises an attachment having geometry complementary to an opening within a rotor disk for attaching the at least one of the plurality of blades to the rotor disk.

20. The turbine of claim 19, wherein:
    the recesses extend through the attachment, thereby defining a bore therethrough; and
    the composite inlay is disposed within the bore and bonded to a surface of the attachment defining the bore.

21. The turbine of claim 16, the turbine blade further comprising:
    a covering having a wear and impact resistance that is greater than a wear and impact resistance of material of the composite inlay, the covering disposed over the composite inlay.

* * * * *